(12) United States Patent
Kobayashi et al.

(10) Patent No.: US 8,395,749 B2
(45) Date of Patent: Mar. 12, 2013

(54) LIQUID CRYSTAL DISPLAY DEVICE AND ELECTRONIC APPARATUS

(75) Inventors: Osamu Kobayashi, Tottori (JP); Osamu Kai, Tottori (JP); Eiko Hirose, Tottori (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 13/005,199

(22) Filed: Jan. 12, 2011

(65) Prior Publication Data
US 2011/0181808 A1 Jul. 28, 2011

(30) Foreign Application Priority Data

Jan. 27, 2010 (JP) ................................. 2010-015109

(51) Int. Cl.
*G02F 1/1333* (2006.01)
(52) U.S. Cl. ....................................... 349/158; 349/110
(58) Field of Classification Search .................. 349/158, 349/110
See application file for complete search history.

(56) References Cited

U.S. PATENT DOCUMENTS

| 5,771,085 | A  | * | 6/1998 | Ochi et al. | 349/158 |
| 5,936,695 | A  | * | 8/1999 | Hida et al. | 349/153 |
| 6,717,646 | B1 | * | 4/2004 | Park et al. | 349/158 |
| 7,719,637 | B2 | * | 5/2010 | SangYoon et al. | 349/110 |

FOREIGN PATENT DOCUMENTS
JP 2000-250021 9/2000

* cited by examiner

*Primary Examiner* — James Dudek
(74) *Attorney, Agent, or Firm* — K&L Gates LLP (57) ABSTRACT

A liquid crystal display device includes: a component substrate including a transistor device; an opposing substrate disposed so as to face the component substrate through a liquid crystal layer; a back light disposed on a side of the component substrate located opposite to the opposing substrate; first and second measurement portions formed on a surface of the component substrate and the opposing substrate, respectively, located on the liquid crystal layer side and used for measuring a difference between bonding positions of the component substrate and the opposing substrate; a measurement opening portion disposed on the second measurement portion side; and a light shielding layer disposed between the component substrate and the second measurement portion and preventing transmission of light from the back light through the measurement opening portion.

10 Claims, 8 Drawing Sheets

FIG.1
EMBODIMENT OF PRESENT INVENTION

FIG.2
COMPARATIVE EXAMPLE

LIQUID CRYSTAL DISPLAY DEVICE AND ELECTRONIC APPARATUS

CROSS REFERENCES TO RELATED APPLICATIONS

The present application claims priority to Japanese Priority Patent Application JP 2010-015109 filed in the Japan Patent Office on Jan. 27, 2010, the entire contents of which is hereby incorporated by reference.

BACKGROUND

The present application relates to a liquid crystal display device and an electronic apparatus, and more particularly, to a liquid crystal display device and an electronic apparatus having measurement portions that are formed on the surfaces of a component substrate and an opposing substrate and are used for measuring a difference between bonding positions of the component substrate and the opposing substrate.

In related art, a liquid crystal display device and an electronic apparatus having measurement portions that are formed on the surfaces of a component substrate and an opposing substrate and are used for measuring a difference between bonding positions of the component substrate and the opposing substrate are known (for example, see JP-A-2000-250021).

In JP-A-2000-250021 described above, a liquid crystal display device including: a TFT-side glass substrate (component substrate); an opposing-side glass substrate (opposing substrate) that is disposed so as to face the TFT-side glass substrate through a liquid crystal layer; an alignment marker (measurement portion) for a TFT substrate-side panel that is formed on the surface of the TFT-side glass substrate; an alignment marker (measurement portion) for an opposing substrate-side panel that is formed on the surface of the opposing-side glass substrate; and a back light that is disposed on a side of the TFT-side glass substrate that is located opposite to the liquid crystal layer is disclosed. In this liquid crystal display device, in a process of bonding the TFT-side glass substrate and the opposing-side glass substrate, the TFT-side glass substrate and the opposing-side glass substrate can be bonded together by overlapping the alignment marker for the TFT substrate-side panel and the alignment marker for the opposing substrate-side panel with each other.

However, in the liquid crystal display device disclosed in JP-A-2000-250021 described above, there is a disadvantage that, for example, when light emitted from the back light is emitted from the TFT-side glass substrate toward the opposing-side glass substrate, the light is shielded in a portion in which the alignment marker is formed, but the light is transmitted through a portion in which the alignment marker is not formed. Accordingly, as the light emitted from the back light is transmitted through the portion in which the alignment marker is not formed, there is a problem in that light leakage occurs from the opposing-side glass substrate side.

Thus, it is desirable to provide a liquid crystal display device and an electronic apparatus capable of suppressing leakage of light emitted from a back light from the opposing substrate side.

According to an embodiment, there is provided a liquid crystal display device including: a component substrate that includes a transistor device; an opposing substrate that is disposed so as to face the component substrate through a liquid crystal layer; a back light that is disposed on a side of the component substrate that is located opposite to the opposing substrate; a first measurement portion that is formed on a surface of the component substrate located on the liquid crystal layer side and is used for measuring a difference between bonding positions of the component substrate and the opposing substrate; a second measurement portion that is formed on a surface of the opposing substrate located on the liquid crystal layer side and is used for measuring a difference between the bonding positions of the component substrate and the opposing substrate; a measurement opening portion that is disposed on the second measurement portion side; and a light shielding layer that is disposed between the component substrate and the second measurement portion and prevents transmission of light emitted from the back light through the measurement opening portion.

According to the liquid crystal display device, as described above, by disposing the light shielding layer between the component substrate and the second measurement portion for preventing transmission of light emitted from the back light through the measurement opening portion, the light emitted from the back light is shielded by the light shielding layer disposed between the component substrate and the second measurement portion. Accordingly, leakage of the light emitted from the back light from the opposing substrate side can be suppressed.

In the above-described liquid crystal display device, it is preferable that the light shielding layer is disposed so as to cover at least an area corresponding to the measurement opening portion in the plan view. In such a configuration, the light emitted from the back light is shielded by the light shielding layer, and accordingly, transmission of the light at least through the measurement opening portion can be prevented. Therefore, leakage of the light emitted from the back light from the measurement opening portion can be reliably suppressed.

In the above-described liquid crystal display device, it is preferable that the first measurement portion and the second measurement portion include a first calibration layer and a second calibration layer, respectively, that have a calibration scale shape used for reading a numeric value, and the light shielding layer is disposed so as to have a shape reflecting a shape of the first calibration layer configuring the first measurement portion on a surface of the first measurement portion that is located on a side opposite to the back light. In such a configuration, the external shape (calibration scale shape) of the light shielding layer in which the shape of the first calibration layer is reflected can be read out. Accordingly, by reading out the external shape (calibration scale shape) of the light shielding layer and the second calibration layer (calibration scale), a difference between the bonding positions of the component substrate and the opposing substrate can be measured.

Preferably, the above-described liquid crystal display device further includes an insulating film that is formed between the first measurement portion and the light shielding layer, wherein the insulating film is formed in a shape reflecting the shape of the first calibration layer that configures the first measurement portion, and the light shielding layer is formed in a shape reflecting a shape of a calibration scale of the insulating film in which the shape of the first calibration layer configuring the first measurement portion is reflected. In such a configuration, also in a case where the insulating film is formed between the first measurement portion and the light shielding layer, the external shape (calibration scale) of the light shielding layer can be read out. Accordingly, by reading out the external shape of the light shielding layer and the second calibration layer, a difference between the bonding positions of the component substrate and the opposing substrate can be measured.

In the above-described liquid crystal display device having the first measurement portion including the first calibration layer and the second measurement portion including the second calibration layer, it is preferable that the first calibration layer and the second calibration layer are formed in a comb-teeth shape in the plan view, the light shielding layer that is formed on the surface of the first calibration layer that is located on a side opposite to the back light is formed in a comb-teeth shape in which the shape of the calibration scale of the first calibration layer is reflected in the plan view, a width of a comb-teeth portion of the light shielding layer is formed to be approximately equal to a width between a comb-teeth portion and a comb-teeth portion of the second calibration layer, and a width of a comb-teeth portion of the first calibration layer is smaller than the width of the comb-teeth portion of the light shielding layer. In such a configuration, by reading out a position on the calibration scale at which the comb-teeth portion of the light shielding layer overlaps without any gap with a space between the comb-teeth portion and the comb-teeth portion of the second calibration layer in the plan view, the amount of deviation of the bonding positions of the component substrate and the opposing substrate can be measured.

In the above-described liquid crystal display device having the first measurement portion including the first calibration layer and the second measurement portion including the second calibration layer, it is preferable that the transistor device includes a gate electrode, a source electrode, and a drain electrode, the first calibration layer is formed from a same metal layer as that of the gate electrode of the transistor device, and the light shielding layer is formed from a same metal layer as that of the source electrode and the drain electrode of the transistor device. In such a configuration, differently from a case where the first calibration layer and the gate electrode of the transistor device are separately formed and a case where the light shielding layer and the source electrode and the drain electrode of the transistor device are formed separately, an increase in the number of manufacturing processes at the time of manufacturing the first calibration layer and the light shielding layer can be suppressed.

In the above-described liquid crystal display device, the light shielding layer is preferably disposed between the component substrate and the first measurement portion so as to prevent transmission of light emitted from the back light through the measurement opening portion. In such a configuration, the light emitted from the back light is shielded by the light shielding layer disposed between the component substrate and the first measurement portion, and accordingly, the transmission of light through the measurement opening portion through the first measurement portion can be suppressed. In addition, by disposing the light shielding layer to the component substrate side relative to the first measurement portion, the first measurement portion and the second measurement portion can be directly visually recognized from the measurement opening portion on the opposing substrate side. Accordingly, the difference between the bonding positions of the component substrate and the opposing substrate can be measured more accurately by using the first measurement portion and the second measurement portion.

In such a case, it is preferable that the first measurement portion and the second measurement portion include a first calibration layer and a second calibration layer, respectively, that have a calibration scale shape used for reading a numeric value, the transistor device includes a gate electrode, a source electrode, and a drain electrode, the first calibration layer is formed from a same metal layer as that of the source electrode and the drain electrode of the transistor device, and the light shielding layer is formed from a same metal layer as that of the gate electrode of the transistor device. By configuring as described above, differently from a case where the first calibration layer and the source electrode and the drain electrode of the transistor device are formed separately and a case where the light shielding layer and the gate electrode of the transistor device are formed separately, an increase in the number of manufacturing processes at the time of manufacturing the first calibration layer and the light shielding layer can be suppressed.

Preferably, the above-described liquid crystal display device includes a black matrix that is disposed on a surface of the opposing substrate that is located on a back light side, wherein the second measurement portion is formed from a same layer as that of the black matrix. In such a configuration, differently from a case where the second measurement portion and the black matrix are separately formed, an increase in the number of manufacturing processes at the time of manufacturing the second calibration layer can be suppressed.

According to another embodiment, there is provided an electronic apparatus including any one of the above-described liquid crystal display devices. According to the above-described electronic apparatus, an electronic apparatus including the liquid crystal display device capable of suppressing leakage of light emitted from the back light from the opposing substrate side can be acquired.

SUMMARY

However, in the liquid crystal display device disclosed in JP-A-2000-250021 described above, there is a disadvantage that, for example, when light emitted from the back light is emitted from the TFT-side glass substrate toward the opposing-side glass substrate, the light is shielded in a portion in which the alignment marker is formed, but the light is transmitted through a portion in which the alignment marker is not formed. Accordingly, as the light emitted from the back light is transmitted through the portion in which the alignment marker is not formed, there is a problem in that light leakage occurs from the opposing-side glass substrate side.

Thus, it is desirable to provide a liquid crystal display device and an electronic apparatus capable of suppressing leakage of light emitted from a back light from the opposing substrate side.

According to an embodiment, there is provided a liquid crystal display device including: a component substrate that includes a transistor device; an opposing substrate that is disposed so as to face the component substrate through a liquid crystal layer; a back light that is disposed on a side of the component substrate that is located opposite to the opposing substrate; a first measurement portion that is formed on a surface of the component substrate located on the liquid crystal layer side and is used for measuring a difference between bonding positions of the component substrate and the opposing substrate; a second measurement portion that is formed on a surface of the opposing substrate located on the liquid crystal layer side and is used for measuring a difference between the bonding positions of the component substrate and the opposing substrate; a measurement opening portion that is disposed on the second measurement portion side; and a light shielding layer that is disposed between the component substrate and the second measurement portion and prevents transmission of light emitted from the back light through the measurement opening portion.

According to the liquid crystal display device, as described above, by disposing the light shielding layer between the component substrate and the second measurement portion for preventing transmission of light emitted from the back light through the measurement opening portion, the light emitted from the back light is shielded by the light shielding layer disposed between the component substrate and the second measurement portion. Accordingly, leakage of the light emitted from the back light from the opposing substrate side can be suppressed.

In the above-described liquid crystal display device, it is preferable that the light shielding layer is disposed so as to cover at least an area corresponding to the measurement opening portion in the plan view. In such a configuration, the light emitted from the back light is shielded by the light shielding layer, and accordingly, transmission of the light at least through the measurement opening portion can be prevented. Therefore, leakage of the light emitted from the back light from the measurement opening portion can be reliably suppressed.

In the above-described liquid crystal display device, it is preferable that the first measurement portion and the second measurement portion include a first calibration layer and a second calibration layer, respectively, that have a calibration scale shape used for reading a numeric value, and the light shielding layer is disposed so as to have a shape reflecting a shape of the first calibration layer configuring the first measurement portion on a surface of the first measurement portion that is located on a side opposite to the back light. In such a configuration, the external shape (calibration scale shape) of the light shielding layer in which the shape of the first calibration layer is reflected can be read out. Accordingly, by reading out the external shape (calibration scale shape) of the light shielding layer and the second calibration layer (calibration scale), a difference between the bonding positions of the component substrate and the opposing substrate can be measured.

Preferably, the above-described liquid crystal display device further includes an insulating film that is formed between the first measurement portion and the light shielding layer, wherein the insulating film is formed in a shape reflecting the shape of the first calibration layer that configures the first measurement portion, and the light shielding layer is formed in a shape reflecting a shape of a calibration scale of the insulating film in which the shape of the first calibration layer configuring the first measurement portion is reflected. In such a configuration, also in a case where the insulating film is formed between the first measurement portion and the light shielding layer, the external shape (calibration scale) of the light shielding layer can be read out. Accordingly, by reading out the external shape of the light shielding layer and the second calibration layer, a difference between the bonding positions of the component substrate and the opposing substrate can be measured.

In the above-described liquid crystal display device having the first measurement portion including the first calibration layer and the second measurement portion including the second calibration layer, it is preferable that the first calibration layer and the second calibration layer are formed in a comb-teeth shape in the plan view, the light shielding layer that is formed on the surface of the first calibration layer that is located on a side opposite to the back light is formed in a comb-teeth shape in which the shape of the calibration scale of the first calibration layer is reflected in the plan view, a width of a comb-teeth portion of the light shielding layer is formed to be approximately equal to a width between a comb-teeth portion and a comb-teeth portion of the second calibration layer, and a width of a comb-teeth portion of the first calibration layer is smaller than the width of the comb-teeth portion of the light shielding layer. In such a configuration, by reading out a position on the calibration scale at which the comb-teeth portion of the light shielding layer overlaps without any gap with a space between the comb-teeth portion and the comb-teeth portion of the second calibration layer in the plan view, the amount of deviation of the bonding positions of the component substrate and the opposing substrate can be measured.

In the above-described liquid crystal display device having the first measurement portion including the first calibration layer and the second measurement portion including the second calibration layer, it is preferable that the transistor device includes a gate electrode, a source electrode, and a drain electrode, the first calibration layer is formed from a same metal layer as that of the gate electrode of the transistor device, and the light shielding layer is formed from a same metal layer as that of the source electrode and the drain electrode of the transistor device. In such a configuration, differently from a case where the first calibration layer and the gate electrode of the transistor device are separately formed and a case where the light shielding layer and the source electrode and the drain electrode of the transistor device are formed separately, an increase in the number of manufacturing processes at the time of manufacturing the first calibration layer and the light shielding layer can be suppressed.

In the above-described liquid crystal display device, the light shielding layer is preferably disposed between the component substrate and the first measurement portion so as to prevent transmission of light emitted from the back light through the measurement opening portion. In such a configuration, the light emitted from the back light is shielded by the light shielding layer disposed between the component substrate and the first measurement portion, and accordingly, the transmission of light through the measurement opening portion through the first measurement portion can be suppressed. In addition, by disposing the light shielding layer to the component substrate side relative to the first measurement portion, the first measurement portion and the second measurement portion can be directly visually recognized from the measurement opening portion on the opposing substrate side. Accordingly, the difference between the bonding positions of the component substrate and the opposing substrate can be measured more accurately by using the first measurement portion and the second measurement portion.

In such a case, it is preferable that the first measurement portion and the second measurement portion include a first calibration layer and a second calibration layer, respectively, that have a calibration scale shape used for reading a numeric value, the transistor device includes a gate electrode, a source electrode, and a drain electrode, the first calibration layer is formed from a same metal layer as that of the source electrode and the drain electrode of the transistor device, and the light shielding layer is formed from a same metal layer as that of the gate electrode of the transistor device. By configuring as described above, differently from a case where the first calibration layer and the source electrode and the drain electrode of the transistor device are formed separately and a case where the light shielding layer and the gate electrode of the transistor device are formed separately, an increase in the number of manufacturing processes at the time of manufacturing the first calibration layer and the light shielding layer can be suppressed.

Preferably, the above-described liquid crystal display device includes a black matrix that is disposed on a surface of the opposing substrate that is located on a back light side, wherein the second measurement portion is formed from a same layer as that of the black matrix. In such a configuration, differently from a case where the second measurement portion and the black matrix are separately formed, an increase in the number of manufacturing processes at the time of manufacturing the second calibration layer can be suppressed.

According to another embodiment, there is provided an electronic apparatus including any one of the above-described liquid crystal display devices. According to the above-described electronic apparatus, an electronic apparatus including the liquid crystal display device capable of suppressing leakage of light emitted from the back light from the opposing substrate side can be acquired.

Additional features and advantages are described herein, and will be apparent from the following Detailed Description and the figures.

DETAILED DESCRIPTION

Embodiments of the present application will be described below in detail with reference to the drawings.

First, before a detailed embodiment is described, a schematic structure (constitution) of a liquid crystal display device 100 according to an embodiment will be described in comparison with a comparative example, with reference to FIGS. 1 and 2.

Figure 1:
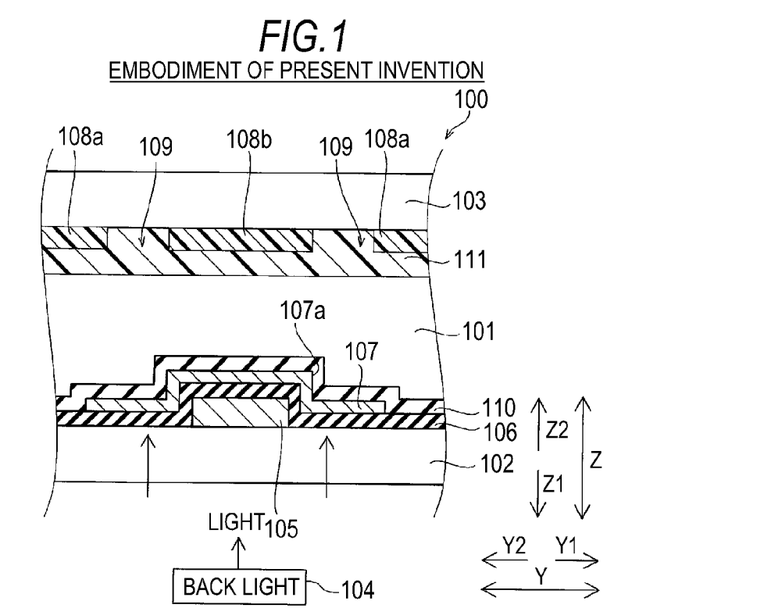
FIG. 1 is a conceptual diagram for illustrating a schematic structure of a liquid crystal display device according to an embodiment.

The liquid crystal display device 100 according to the embodiment, as shown in FIG. 1, includes a TFT substrate (component substrate) 102 and an opposing substrate 103 with a liquid crystal layer 101 pinched therebetween. In addition, a back light 104 that is used for emitting light from the TFT substrate 102 side to the opposing substrate 103 side is disposed to the Z1-direction side of the TFT substrate 102.

Although not shown in FIG. 1, in a frame region surrounding the display region of the liquid crystal display device 100 according to the embodiment, a TFT substrate-side mark (the first measurement portion (the first calibration layer)) 105 having a calibration scale shape in the plan view is formed on the surface of the TFT substrate 102. In addition, on the surfaces of the TFT substrate-side mark 105 and the TFT substrate 102, an insulating film 106 is formed. This insulating film 106 is formed in a shape reflecting the shape of the calibration scale of the TFT substrate-side mark 105. On the surface of the insulating film 106, a light shielding layer 107 is formed. Here, in the liquid crystal display device 100 according to the embodiment, the light shielding layer 107 is formed so as to prevent transmission of light, which is emitted from the back light 104, through a measurement opening portion 109 formed in the periphery area of the opposing substrate-side mark 108b. In addition, the light shielding layer 107 is formed on the TFT substrate 102 so as to cover (overlap) an area corresponding to the TFT substrate-side mark 105, the opposing substrate-side mark 108b, and the measurement opening portion 109 in the plan view and is formed to be larger than the opening area of the measurement opening portion 109. In addition, the light shielding layer 107 includes a calibration portion 107a that reflects the shape of the insulating film 106 reflecting the shape of the calibration scale of the TFT substrate-side mark 105. On the surface of the light shielding layer 107, an insulating film 110 is formed.

In addition, on the surface (on the surface on the Z1-direction side) of the opposing substrate 103, a black matrix 108a is formed. In this black matrix 108a, measurement opening portions 109 that are used for measuring a difference between the TFT substrate 102 and the opposing substrate 103 are disposed. On the surface of the opposing substrate 103, an opposing substrate-side mark (the second measurement portion (the second calibration layer)) 108b that is used for measuring a difference between bonding positions of the TFT substrate 102 and the opposing substrate 103 is formed in correspondence with the measurement opening portions 109. The opposing substrate-side mark 108b is formed so as to overlap with the TFT substrate-side mark 105 and the calibration portion 107a of the light shielding layer 107 in the plan view. By checking a difference between the calibration scale of the calibration portion 107a of the light shielding layer 107 and the calibration scale of the opposing substrate-side mark 108b through the measurement opening portion 109, a configuration is achieved where a difference between the bonding positions of the TFT substrate 102 and the opposing substrate 103 can be measured. In addition, on the surfaces of the opposing substrate-side mark 108b and the opposing substrate 103, an overcoat layer 111 is formed.

In the example shown in FIG. 1, the light shielding layer 107 is formed between the TFT substrate-side mark 105 and the opposing substrate-side mark 108b so as to cover the TFT substrate-side mark 105. However, the present application is not limited thereto. Thus, the light shielding layer 107 may be arranged between the TFT substrate-side mark 105 and the TFT substrate 102. In such a case, at the time of measuring the bonding difference, the bonding difference is measured by using not the light shielding layer 107 but the TFT substrate-side mark 105 and the opposing substrate-side mark 108b. In addition, this point will be described in detail in the second embodiment described later.

Figure 2:
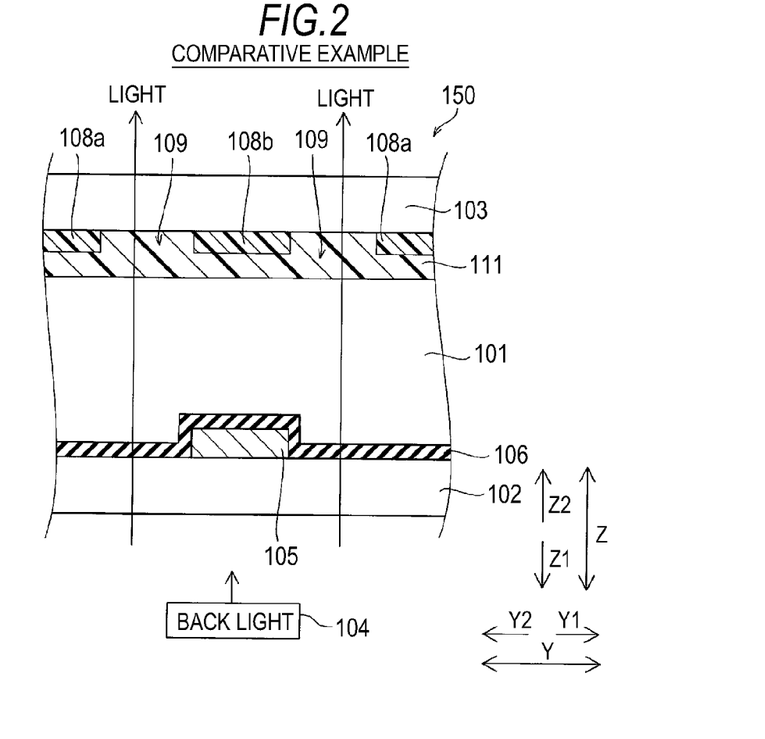
FIG. 2 is a conceptual diagram for illustrating a schematic structure of a liquid crystal display device of a comparative example.

Next, in a liquid crystal display device 150 of a comparative example of the present application, as shown in FIG. 2, a TFT substrate-side mark 105 is formed on the surface of a TFT substrate 102. In addition, an insulating film 106 is formed on the surface of the TFT substrate-side mark 105.

The configuration of the opposing substrate 103 side is similar to that of the liquid crystal display device 100 according to the embodiment shown in FIG. 1. In addition, the liquid crystal display device 150 of the comparative example is configured such that a difference between the bonding positions of the TFT substrate 102 and the opposing substrate 103 can be measured by checking the calibration scale of a TFT substrate-side mark 105 and the calibration scale of an opposing substrate-side mark 108b through a measurement opening portion 109. In addition, in the configuration of the liquid crystal display device 150 of the comparative example, the light shielding layer 107 (see FIG. 1) of the embodiment is not formed on the surface of the insulating film 106. Accordingly, light emitted from a back light 104 is transmitted through a measurement opening portion 109.

As above, the liquid crystal display device 100 according to the embodiment shown in FIG. 1, differently from the liquid crystal display device 150 of the comparative example shown in FIG. 2, light emitted from the back light 104 is shielded by the light shielding layer 107. Accordingly, occurrence of light leakage from the measurement opening portion 109 can be suppressed.

Hereinafter, embodiments in which the above-described schematic configuration according to the embodiment is formed to be more specific will be described.

First Embodiment

The configuration of a liquid crystal display device 100a according to the first embodiment will be described with reference to FIGS. 3 to 8. In the first embodiment, a case where an embodiment is applied to an vertical electric field mode liquid crystal display device 100a will be described.

Figure 3:
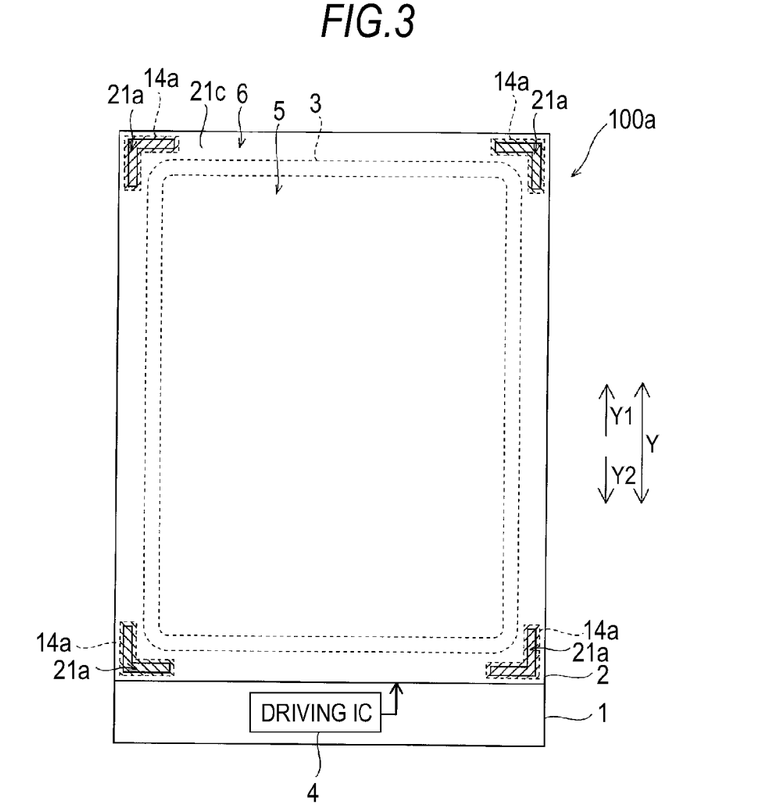
FIG. 3 is a plan view of a liquid crystal display device according to a first embodiment.

The liquid crystal display device 100a according to the first embodiment, as shown in FIG. 3, includes a TFT substrate 1 having an approximately rectangular shape and an opposing substrate 2 having an approximately rectangular shape. Here, the TFT substrate 1 is an example of a "component substrate" according to an embodiment. The TFT substrate 1 and the opposing substrate 2 are bonded together by a sealing member 3 with a liquid crystal layer 20, to be described later, pinched therebetween. The sealing member 3 is coated along the outer edge portions of the TFT substrate 1 and the opposing substrate 2. In addition, on the surface of the TFT substrate 1, a driving IC 4 that is used for driving the liquid crystal display device 100a is disposed. In addition, the TFT substrate 1 and the opposing substrate 2 include display region 5 in which a plurality of pixels are disposed and a frame region 6 that is formed so as to surround the display region 5. On the Z1-direction side of the TFT substrate 1, a back light 7 (see FIG. 6) is disposed. This back light 7 is configured so as to emit light from the TFT substrate 1 toward the opposing substrate 2.

Figure 4:
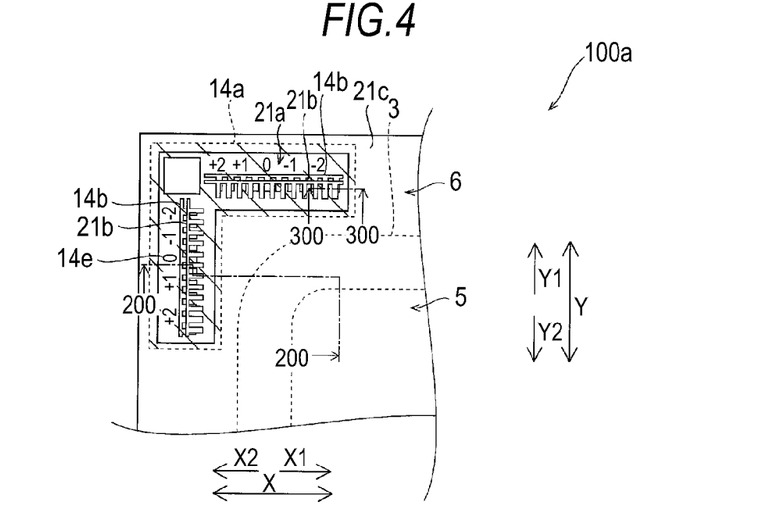
FIG. 4 is a plan view of the periphery of a measurement opening portion of a liquid crystal display device according to the first embodiment.
Figure 5:
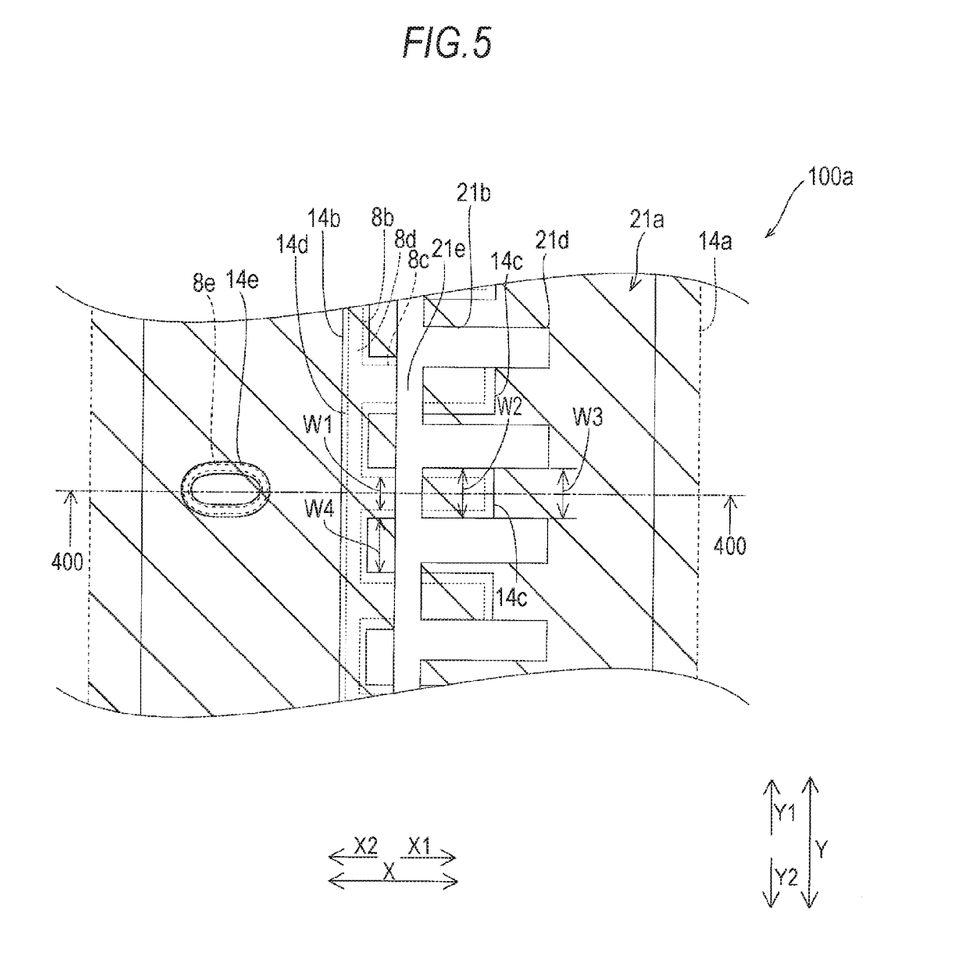
FIG. 5 is an enlarged plan view of the periphery of the measurement opening portion of the liquid crystal display device according to the first embodiment.
Figure 6:
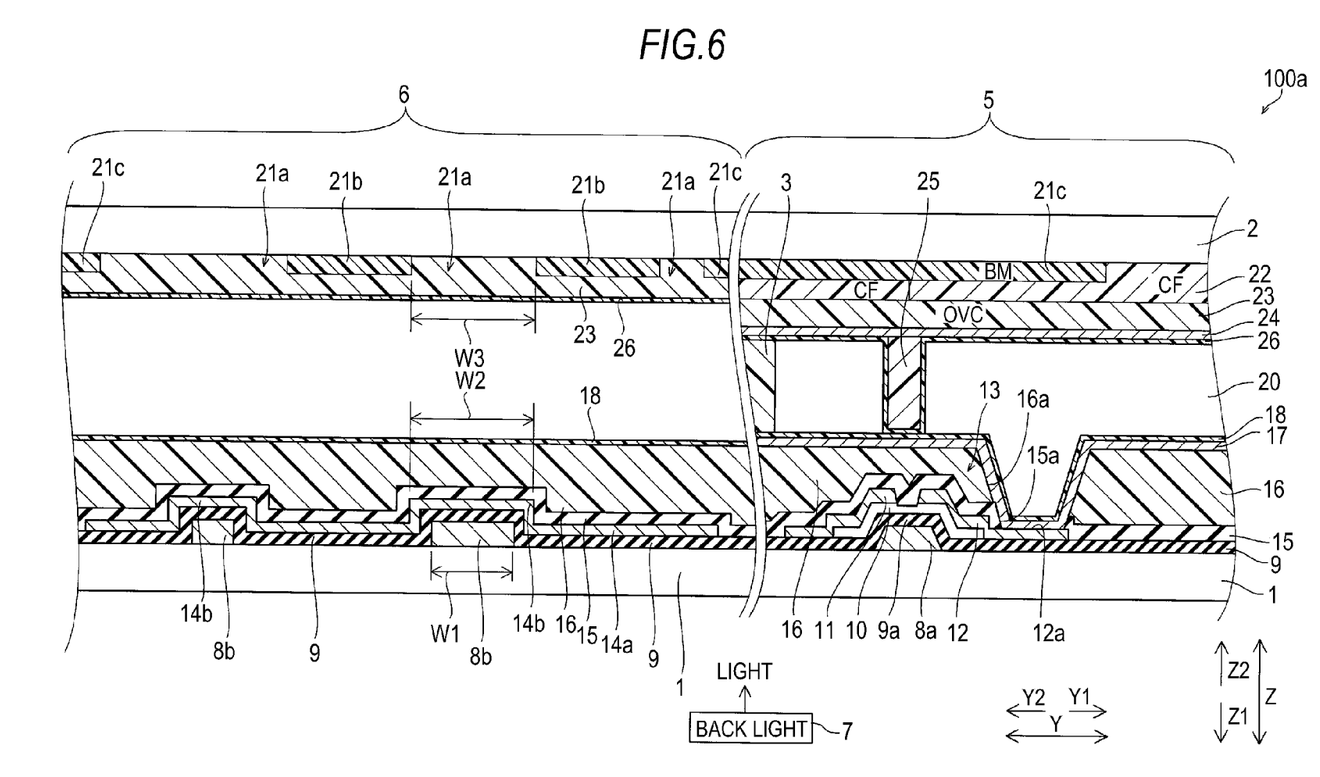
FIG. 6 is a cross-sectional view taken along line 200-200 shown in FIG. 4.
Figure 8:
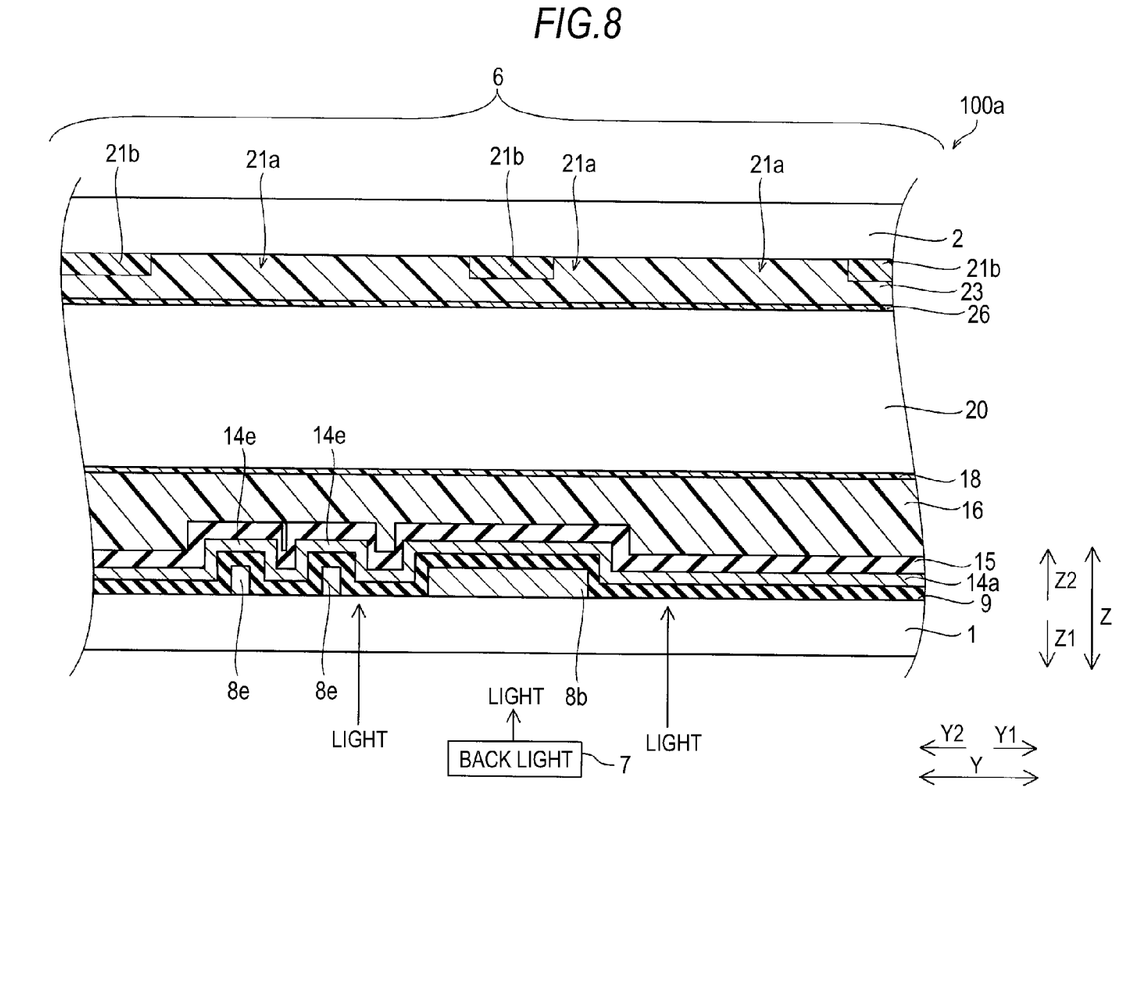
FIG. 8 is a cross-sectional view taken along line 400-400 shown in FIG. 5.

In addition, as a detailed cross-sectional structure of the display region 5 and the frame region 6, as shown in FIG. 6, a gate electrode 8a is formed on the surface of the TFT substrate 1, in the display region 5. In addition, TFT substrate-side marks 8b formed from the same metal layer as that of the gate electrode 8a are formed on the surface of the TFT substrate 1, in the frame region 6. Here, the TFT substrate-side mark 8b is an example of "a first measurement portion" and "a first calibration layer" according to an embodiment. The TFT substrate-side marks 8b, as shown in FIG. 4, are formed on the four corners on the surface of the TFT substrate 1 so as to extend in the X direction and the Y direction. In addition, the TFT substrate-side mark 8b, as shown in FIG. 5, has a comb-teeth shape in the plan view. The TFT substrate-side mark 8b includes a plurality of comb-teeth portions 8c that are formed in the X direction and have a calibration scale shape used for reading a numeric value and a plurality of connection portions 8d that are formed in the Y direction and connect the plurality of comb-teeth portions 8c. As shown in FIGS. 4 and 5, numerical portions 8e such as "−2", "−1", "0", "+1", "+2", and the like are formed near the TFT substrate-side mark 8b. As shown in FIG. 8, the numerical portion 8e is formed from the same metal layer as that of the gate electrode 8a (see FIG. 6) and the TFT substrate-side mark 8b.

In addition, in the display region 5, on the surfaces of the gate electrode 8a and the TFT substrate 1, an insulating film 9 including a gate insulating film 9a that is formed from SiN or the like is formed. In addition, the insulating film 9 is formed on the surfaces of the TFT substrate-side marks 8b and the TFT substrate 1, in the frame region 6. The insulating film 9 that is formed on the surface of the TFT substrate-side mark 8b is formed in the shape (comb-teeth shape) reflecting the shape of the calibration scale of the TFT substrate-side mark 8b. In addition, the insulating film 9 that is formed on the surface of the numerical portion 8e is formed in the shape (numeric value) reflecting the shape of the numeric value of the numerical portion 8e.

In addition, in the display region 5, a semiconductor layer 10 is formed so as to face the gate electrode 8a through the insulating film 9. The semiconductor layer 10 is formed from a−Si or n+Si. On the upper side of the semiconductor layer 10, a source electrode 11 and a drain electrode 12 are formed. A thin film transistor 13 is configured by the gate electrode 8a, the insulating film 9, the semiconductor layer 10, the source electrode 11, and the drain electrode 12.

In the first embodiment, in the frame region 6, on the surface of the insulating film 9 disposed on the surface of the TFT substrate-side mark 8b, a light shielding layer 14a that is formed from the same metal layer as that of the source electrode 11 and the drain electrode 12 of the thin film transistor 13 and is used for preventing the transmission of light emitted from the back light 7 through a measurement opening portion 21a, to be described later, is disposed. This light shielding layer 14a is disposed in an area corresponding to the TFT substrate-side mark 8b, the opposing substrate-side mark 21b, and the measurement opening portion 21a in the plan view. In addition, the light shielding layer 14a is formed in the shape reflecting the shape of the TFT substrate-side mark 8b. Accordingly, the light shielding layer 14a has a calibration portion 14b corresponding to the TFT substrate-side mark 8b. Furthermore, the calibration portion 14b, as shown in FIG. 5, includes a comb-teeth portion 14c corresponding to the comb-teeth portion 8c of the TFT substrate-side mark 8b and a connection portion 14d corresponding to the connection portion 8d. The width W1 of the comb-teeth portion 8c of the TFT substrate-side mark 8b is smaller than the width W2 of the comb-teeth portion 14c of the calibration portion 14b of the light shielding layer 14a.

In addition, as shown in FIG. 4, the light shielding layer 14a is formed in an approximate "L" shape and is formed so as to cover the TFT substrate-side mark 8b formed in the Y direction and the TFT substrate-side mark 8b formed in the X direction in the plan view. As shown in FIG. 6, the light shielding layer 14a is formed on the insulating film 9 so as to cover (overlap with) an area corresponding to the measurement opening portion 21a in the plan view and is formed to have an area larger than the opening area of the measurement opening potion 21a. By reading out a difference between the calibration portion 14b of the light shielding layer 14a and the opposing substrate-side mark 21b, a configuration is achieved where a difference between the bonding positions of the TFT substrate 1 and the opposing substrate 2 can be measured. In addition, in the light shielding layer 14a formed on the surface of the insulating film 9 that is formed on the surface of the numerical portion 8e (see FIG. 5), a numerical portion 14e in the shape reflecting the shape of the numeric value of the numerical portion 8e is formed.

In addition, in the display region 5, a passivation film 15 formed from SiN or the like is formed so as to cover the source electrode 11 and the drain electrode 12. In the passivation film 15, a contact hole 15a is formed. In the frame region 6, the same layer (the passivation film 15) as that of the passivation film 15 formed in the display region 5 is formed on the surface of the light shielding layer 14a.

In the display region 5, a planarization film (OVL) 16 formed from a photosensitive acrylic resin is formed on the surface of the passivation film 15. In the planarization film 16, a contact hole 16a is formed. In addition, in the frame region 6, the same layer (the planarization film 16) as that of the planarization film 16 formed in the display region 5 is formed on the surface of the passivation film 15.

In addition, in the display region 5, a pixel electrode 17 formed from a transparent electrode formed from ITO (Indium Tin Oxide), IZO (Indium Zinc Oxide), or the like is formed on the surface of the planarization film 16. In a contact portion 12a, the pixel electrode 17 and the drain electrode 12 are connected to each other through the contact hole 15a of the passivation film 15 and the contact hole 16a of the planarization film 16. In addition, on the surface of the pixel electrode 17, an alignment film 18 that is formed from an organic film formed from polyimide or the like is formed. In addition, in the frame region 6, the same layer (the alignment film 18) as that of the alignment film 18 formed in the display region 5 is formed on the surface of the planarization film 16.

The opposing substrate 2 is disposed so as to face the TFT substrate 1 with the liquid crystal layer 20 interposed therebetween. In the display region 5, a black matrix (BM) 21c formed from a resin or the like is formed on the surface of the opposing substrate 2 in the Z1-direction side. In addition, in the frame region 6, a measurement opening portion 21a that is used for measuring a difference between the TFT substrate 1 and the opposing substrate 2 is disposed in the black matrix 21c. The measurement opening portion 21a, as shown in FIG. 3 is formed in an approximate "L" shape in portions corresponding to the four corners of the opposing substrate 2 in the frame region 6. In an area of the surface of the TFT substrate 1 corresponding to the measurement opening portion 21a, the calibration portion 14b of the light shielding layer 14a is formed, and, in an area of the surface of the opposing substrate 2 corresponding to the measurement opening portion 21a, an opposing substrate-side mark 21b is formed. In addition, a configuration is achieved where the calibration portion 14b of the light shielding layer 14a corresponding to the TFT substrate-side mark 8b and the opposing substrate-side mark 21b can be visually recognized from the measurement opening portion 21a.

In addition, as shown in FIG. 6, in the frame region 6, the opposing substrate-side mark 21b is formed on the surface of the opposing substrate 2. Here, the opposing substrate-side mark 21b is an example of a "second measurement portion" and a "second calibration layer" according to an embodiment. The opposing substrate-side mark 21b is formed from the same layer as that of the black matrix 21c that is formed on the surface of the opposing substrate 2 in the Z1 direction-side in the display region 5. In addition, the opposing substrate-side marks 21b, as shown in FIGS. 3 and 4, are formed on the four corners of the opposing substrate 2 so as to extend along the X direction and the Y direction. In addition, the opposing substrate-side mark 21b, as shown in FIG. 5, has a comb-teeth shape in the plan view. The opposing substrate-side mark 21b includes a plurality of comb-teeth portions 21d that are formed in the X direction and have a calibration scale shape used for reading a numeric value and a plurality of connection portions 21e that are formed in the Y direction and connect the plurality of comb-teeth portions 21d.

Figure 7:
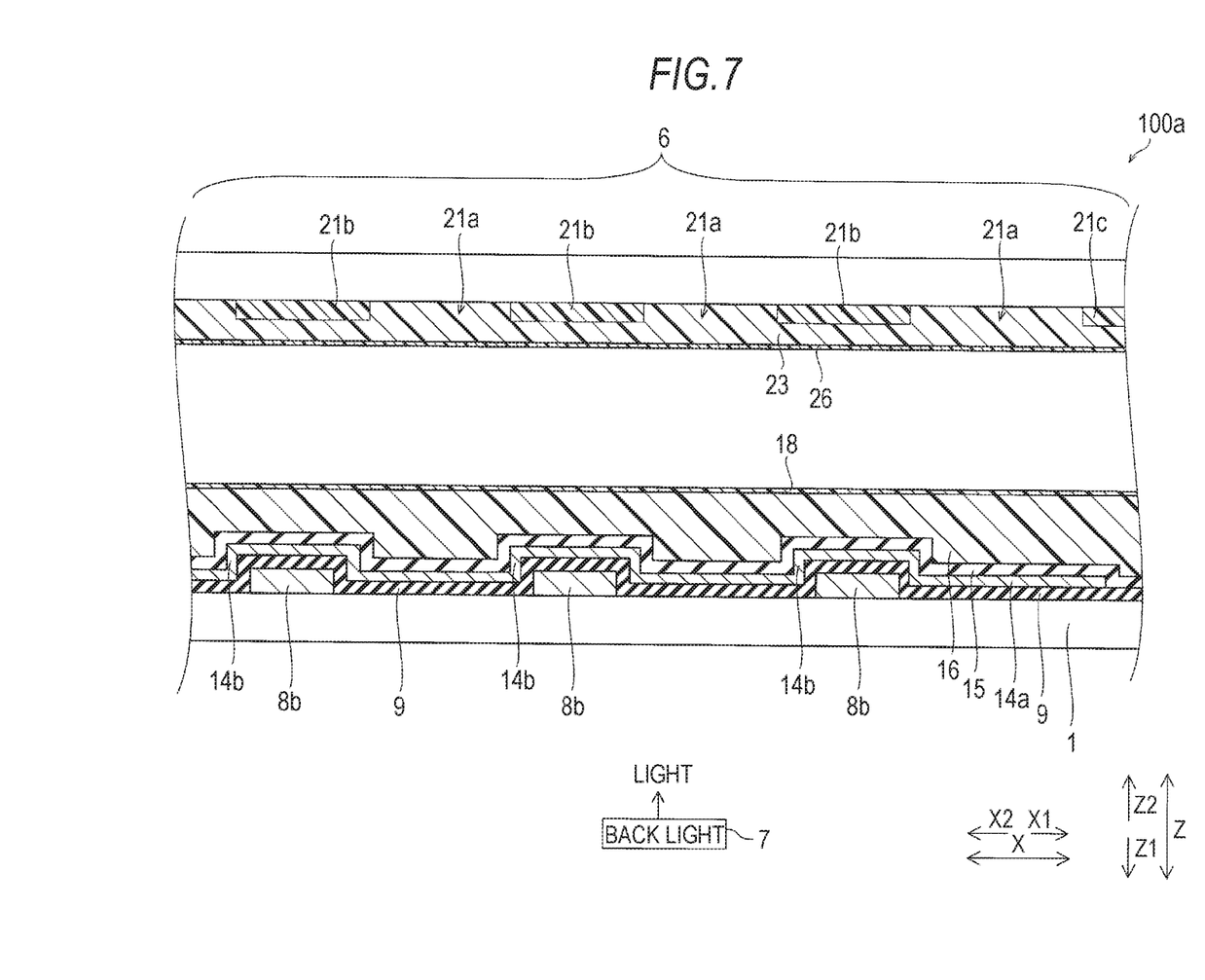
FIG. 7 is a cross-sectional view taken along line 300-300 shown in FIG. 4.

The width W3 of the opposing substrate-side mark 21b between the comb-teeth portion 21d and the comb-teeth portion 21d is approximately the same as the width W2 of the comb-teeth portion 14c of the calibration portion 14b of the light shielding layer 14a. The connection portion 21e of the opposing substrate-side mark 21b and the calibration portion 14b of the light shielding layer 14a are arranged in a state deviated from each other in the X direction in the plan view. As shown in FIG. 5, the width W3 of the opposing substrate-side mark 21b between the comb-teeth portion 21d and the comb-teeth portion 21d is formed to be different from the width W4 of the light shielding layer 14a between the comb-teeth portion 14c and the comb-teeth portion 14c. In other words, the pitch of the comb-teeth portions 21d of the opposing substrate-side mark 21b and the pitch of the comb-teeth portions 14c of the light shielding layer 14a are formed to be different from each other. Accordingly, by reading out a position on the calibration scale at which the comb-teeth portion 14c of the light shielding layer 14a overlaps without any gap with a space between the comb-teeth portion 21d and the comb-teeth portion 21d of the opposing substrate-side mark 21b, the amount of deviation between the bonding positions of the TFT substrate 1 and the opposing substrate 2 can be measured. As shown in FIG. 6, in a case where the comb-teeth portion 14c of the light shielding layer 14a overlaps without any gap with a space between the comb-teeth portion 21d and the comb-teeth portion 21d of the opposing substrate-side mark 21b, the light that is emitted from the back light 7 can be shielded by the light shielding layer 14a disposed in an area corresponding to the measurement opening portion 21a. In addition, as shown in FIG. 7, also in a case where the TFT substrate-side mark 8b and the opposing substrate-side mark 21b are disposed so as to overlap with each other in the plan view, the light that is emitted from the back light 7 can be shielded by the light shielding layer 14a disposed in an area corresponding to the measurement opening portion 21a.

In addition, as shown in FIG. 6, in the display region 5, color filters (CF) 22 of colors including R (red), G (green), B (blue), and the like are formed on the surface of the black matrix 21c. On the surface of the color filter 22, an overcoat layer (OVC) 23 that is formed from an acryl-based photosensitive resin and serves as a protection layer is formed. In addition, in the frame region 6, the same layer as the overcoat layer 23 formed in the display region 5 is formed on the surfaces of the opposing substrate-side mark 21b and the opposing substrate 2.

In addition, in the display region 5, a common electrode 24 that is configured by a transparent electrode formed from ITO (Indium Tin Oxide), IZO (Indium Zinc Oxide), or the like is formed on the surface of the overcoat layer 23. On the surface of the common electrode 24, a photo spacer (PS) 25 that is formed from a resin is formed. The photo spacer 25 has a function for adjusting a cell gap (a distance between the TFT substrate 1 and the opposing substrate 2). In addition, on the surfaces of the photo spacer 25 and the common electrode 24, an alignment film 26 that is formed from polyimide or the like is formed. In the frame region 6, the same layer (the alignment film 26) as that of the alignment film 26 formed in the display region 5 is formed on the surface of the overcoat layer 23.

Next, an operation for reading out the calibration scales of the TFT substrate-side mark 8b and the opposing substrate-side mark 21b will be described with reference to FIG. 5.

In order to measure the difference between bonding positions of the TFT substrate 1 and the opposing substrate 2, a numeric value of a portion is read out in which the comb-teeth portion 14c of the calibration portion 14b of the light shielding layer 14a overlaps without any gap with a space between the comb-teeth portion 21d and the comb-teeth portion 21d of the opposing substrate-side mark 21b in the plan view. For example, in the state shown in FIG. 5, the numeric value of a portion in which the comb-teeth portion 14c of the calibration portion 14b of the light shielding layer 14a overlaps without any gap with a space between the comb-teeth portion 21d and the comb-teeth portion 21d of the opposing substrate-side mark 21b is "0". Accordingly, the amount of deviation between the TFT substrate 1 and the opposing substrate 2 is determined to be "0".

According to the first embodiment, as above, by disposing the light shielding layer 14a so as to cover an area corresponding to the measurement opening portion 21a and the opposing substrate-side mark 21b in the plan view, the light emitted from the back light 7 is shielded by the light shielding layer 14a that is disposed between the TFT substrate 1 and the opposing substrate-side mark 21b. Accordingly, it can be suppressed that the light emitted from the back light 7 leaks from the opposing substrate 2 side.

In addition, according to the first embodiment, as described above, by disposing the light shielding layer 14a so as to have a shape reflecting the shape of the TFT substrate-side mark 8b on the surfaces of the TFT substrate-side mark 8b, the calibration portion 14b of the light shielding layer 14a reflecting the shape of the TFT substrate-side mark 8b can be read out. Accordingly, by reading out the calibration portion 14b of the light shielding layer 14a and the opposing substrate-side mark 21b (calibration scale), a difference between the bonding positions of the TFT substrate 1 and the opposing substrate 2 can be measured.

In addition, according to the first embodiment, as described above, by forming the insulating film 9 so as to have a shape reflecting the shape of the TFT substrate-side mark 8b and forming the light shielding layer 14a so as to have a shape reflecting the shape of the calibration scale of the insulating film 9 in which the shape of the TFT substrate-side mark 8b is reflected, the calibration portion 14b of the light shielding layer 14a can be read out even in a case where the insulating film 9 is formed between the TFT substrate-side mark 8b and the light shielding layer 14a. Accordingly, by reading out the calibration portion 14b of the light shielding layer 14a and the opposing substrate-side mark 21b, the difference between the bonding positions of the TFT substrate 1 and the opposing substrate 2 can be measured.

In addition, according to the first embodiment, as described above, by configuring the width W2 of the comb-teeth portion 14c of the light shielding layer 14a to be approximately equal to the width W3 of the opposing substrate-side mark 21b between the comb-teeth portion 21d and the comb-teeth portion 21d and configuring the width W1 of the comb-teeth portion 8c of the TFT substrate-side mark 8b to be smaller than the width W2 of the comb-teeth portion 14c of the light shielding layer 14a, the amount of deviation between the bonding positions of the TFT substrate 1 and the opposing substrate 2 can be measured by reading out a position on the calibration scale at which the comb-teeth portion 14c of the light shielding layer 14a overlaps without any gap with a space between the comb-teeth portion 21d and the comb-teeth portion 21d of the opposing substrate-side mark 21b.

In addition, according to the first embodiment, as described above, by forming the TFT substrate-side mark 8b from the same metal layer as that of the gate electrode 8a of the thin film transistor 13 and forming the light shielding layer 14a from the same metal layer as that of the source and drain electrodes 11 and 12 of the thin film transistor 13, differently from a case where the TFT substrate-side mark 8b and the gate electrode 8a of the thin film transistor 13 are separately formed and a case where the light shielding layer 14a and the source and drain electrodes 11 and 12 of the thin film transistor 13 are separately formed, an increase in the number of manufacturing processes at the time of manufacturing the TFT substrate-side mark 8b and the light shielding layer 14a can be suppressed.

In addition, according to the first embodiment, as described above, by forming the opposing substrate-side mark 21b from the same layer as that of the black matrix 21c, differently from a case where the opposing substrate-side mark 21b and the black matrix 21c are separately formed, an increase in the number of manufacturing processes at the time of manufacturing the opposing substrate-side mark 21b can be suppressed.

Second Embodiment

Figure 9:
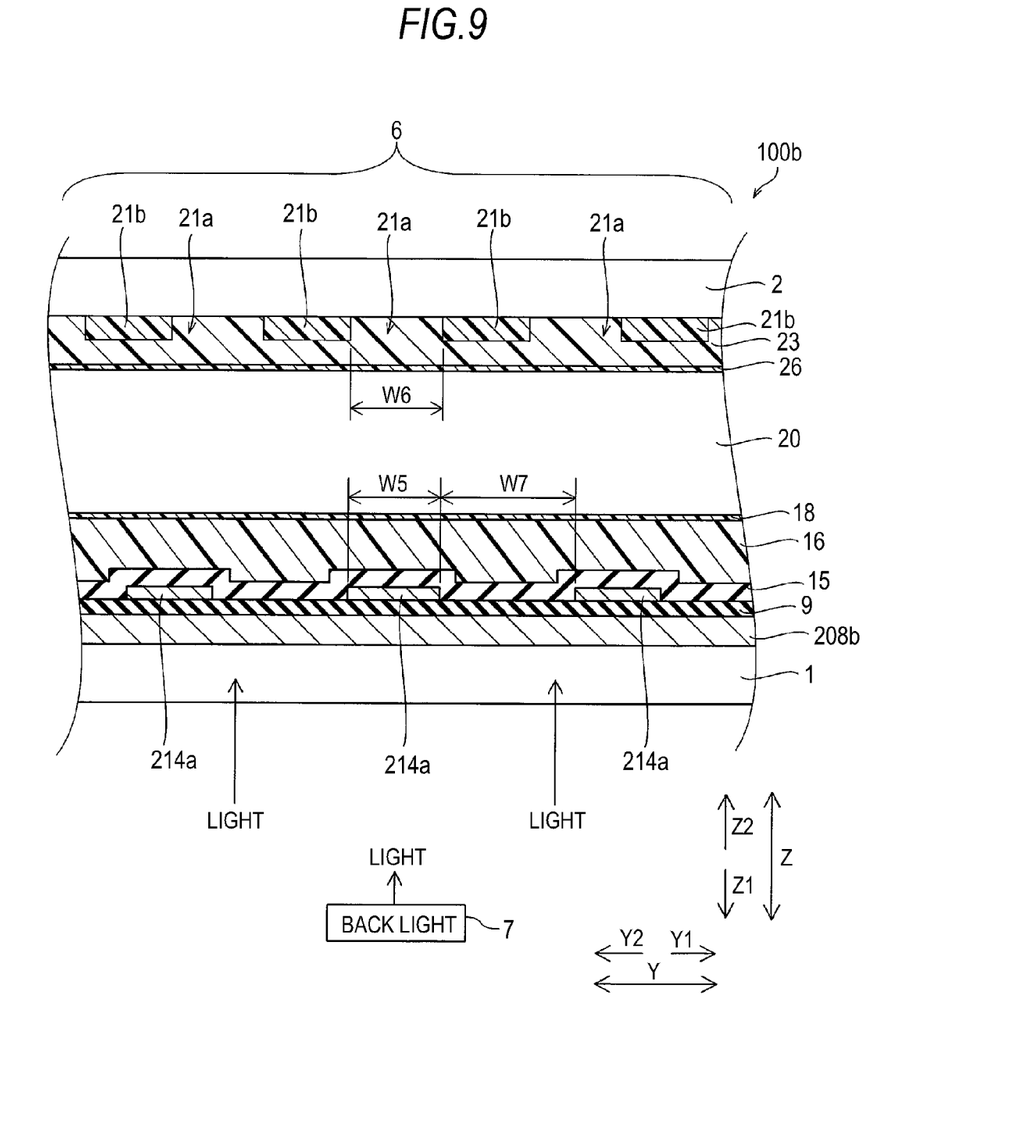
FIG. 9 is a cross-sectional view of a liquid crystal display device according to a second embodiment.

Next, a second embodiment will be described with reference to FIG. 9. In this second embodiment, differently from the first embodiment in which the light shielding layer is formed on the surface of the TFT substrate-side mark, a TFT substrate-side mark is formed on the surface of the light shielding layer.

In a liquid crystal display device 100b according to the second embodiment, a light shielding layer 208b is formed on the surface of a TFT substrate 1. In addition, the light shielding layer 208b is formed so as to cover the entire area corresponding to a measurement opening portion 21a located on the opposing substrate 2 side and an opposing substrate-side mark 21b. Accordingly, the transmission of light emitted from the back light 7 through the measurement opening portion 21a can be prevented. This light shielding layer 208b is formed from the same metal layer as that of the gate electrode 8a of the thin film transistor 13 according to the above-described first embodiment. In addition, on the surface of the light shielding layer 208b, a TFT substrate-side mark 214a is formed through an insulating film 9. The calibration scale of the TFT substrate-side mark 214a can be directly visually recognized from the measurement opening portion 21a. Here, the TFT substrate-side mark 214a is an example of a "first measurement portion" and a "first calibration layer" according to an embodiment.

In addition, the width W5 of the TFT substrate-side mark 214a is approximately equal to an interval (width) W6 between the opposing substrate-side mark 21b and the opposing substrate-side mark 21b. An interval (width) W7 between the TFT substrate-side mark 214a and the TFT substrate-side mark 214a is larger than an interval (width) W6 between the opposing substrate-side mark 21b and the opposing substrate-side mark 21b. In other words, the pitch of the TFT substrate-side marks 214a and the pitch of the opposing substrate-side marks 21b are formed to be different from each other. Accordingly, by directly reading out the calibration scale of the position at which the TFT substrate-side mark 214a overlaps without any gap with a space between the opposing substrate-side mark 21b and the opposing substrate-side mark 21b from the measurement opening portion 21a, the amount of deviation of the bonding positions of the TFT substrate 1 and the opposing substrate 2 can be measured. The other configurations of the second embodiment are the same as those of the above-described first embodiment.

According to the second embodiment, as described above, by disposing the light shielding layer 208b between the TFT substrate 1 and the TFT substrate-side mark 214a so as to prevent the transmission of light emitted from the back light 7 through the measurement opening portion 21a, the light emitted from the back light 7 is shielded by the light shielding layer 208b disposed between the TFT substrate 1 and the TFT substrate-side mark 214a. Accordingly, the transmission of light through the measurement opening portion 21a through the TFT substrate-side mark 214a is suppressed. In addition, by arranging the light shielding layer 208b to the TFT substrate 1 side relative to the TFT substrate-side mark 214a, the TFT substrate-side mark 214a and the opposing substrate-side mark 21b can be directly visually recognized from the measurement opening portion 21a located on the opposing substrate 2 side. Therefore, by using the TFT substrate-side mark 214a and the opposing substrate-side mark 21b, a difference between the bonding positions of the TFT substrate 1 and the opposing substrate 2 can be measured more accurately.

In addition, according to the second embodiment, as described above, by forming the TFT substrate-side mark 214a from the same metal layer as that of the source and drain electrodes 11 and 12 of the thin film transistor 13 and forming the light shielding layer 208b from the same metal layer as that of the gate electrode 8a of the thin film transistor 13, differently from a case where the TFT substrate-side mark 214a and the source and drain electrodes 11 and 12 of the thin film transistor 13 are separately formed and a case where the light shielding layer 208b and the gate electrode 8a of the thin film transistor 13 are separately formed, an increase in the number of manufacturing processes at the time of manufacturing the TFT substrate-side mark 214a and the light shielding layer 208b can be suppressed.

Application Examples

Figure 10:
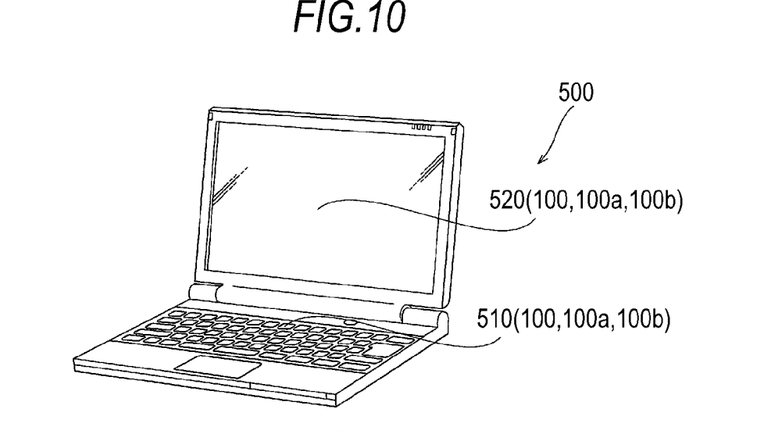
FIG. 10 is a diagram for illustrating the first example of an electronic apparatus using the liquid crystal display device according to the first and second embodiments of the present application.
Figure 11:
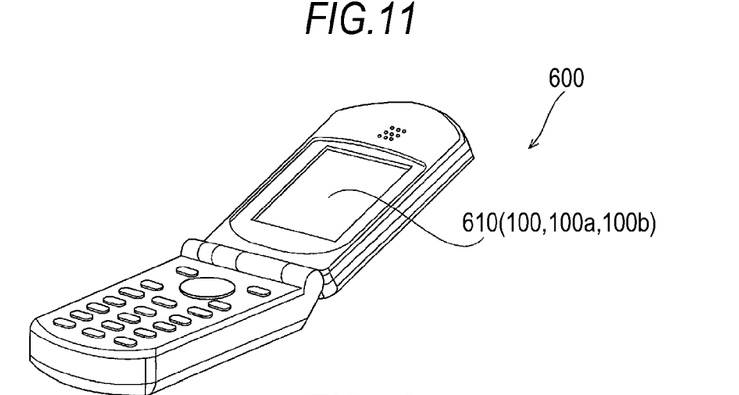
FIG. 11 is a diagram for illustrating the second example of an electronic apparatus using the liquid crystal display device according to the first and second embodiments of the present application.
Figure 12:
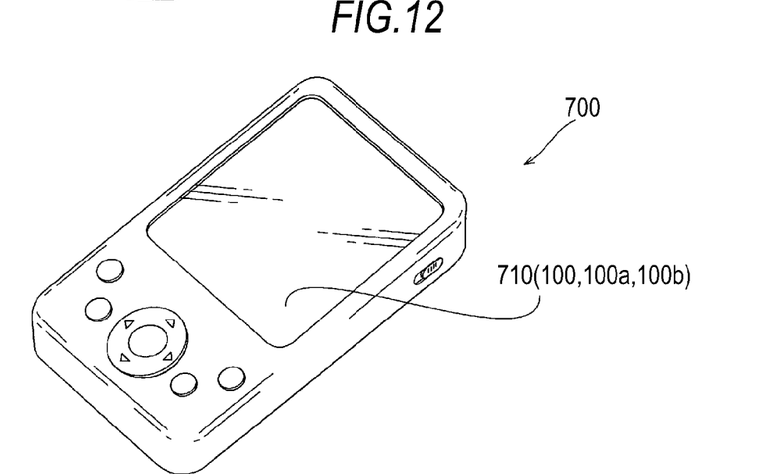
FIG. 12 is a diagram for illustrating the third example of an electronic apparatus using the liquid crystal display device according to the first and second embodiments of the present application.

FIGS. 10 to 12 are diagrams for describing the first to third examples of an electronic apparatus using the above-described liquid crystal display device 100 according to the embodiment and the liquid crystal display devices 100a and 100b according to the first and second embodiments, respectively. Electronic apparatuses using the liquid crystal display device 100 according to the embodiment and the liquid crystal display devices 100a and 100b according to the first and second embodiments will be described with reference to FIGS. 10 to 12.

The liquid crystal display device 100 according to the embodiment and the liquid crystal display devices 100a and 100b according to the first and second embodiments, as shown in FIGS. 10 to 12, can be applied to a PC (Personal Computer) 500 as the first example, a cellular phone 600 as the second example, and a Personal Digital Assistances (PDA) 700 as the third example, and the like.

In the PC 500 of the first example shown in FIG. 10, the liquid crystal display device 100 according to the embodiment and the liquid crystal display devices 100a and 100b according to the first and second embodiments can be used in an input unit 510 such as a keyboard, a display screen 520, and the like. In the cellular phone 600 of the second example shown in FIG. 11, the liquid crystal display device 100 according to the embodiment and the liquid crystal display devices 100a and 100b according to the first and second embodiments are used in a display screen 610. In the personal digital assistants 700 of the third example shown in FIG. 12, the liquid crystal display device 100 according to the embodiment and the liquid crystal display devices 100a and 100b according to the first and second embodiments are used in a display screen 710.

The embodiments disclosed here are examples in all the aspects and should not be considered for purposes of limitation. The scope of the present application is defined not by the description of the above-described embodiments but by the appended claims, and all the changes within the meanings and the scope that are equivalent to the appended claims are included therein.

For example, in the above-described first and second embodiments, examples in which a vertical electric field mode is used are shown as examples. However, the present application is not limited thereto. In an embodiment, a liquid crystal display device of an in-plane switching mode other than the vertical electric field may be used.

According to the above-described first and second embodiments, examples in which the TFT substrate-side mark and the opposing substrate-side mark are used as examples of the first measurement portion and the second measurement portion, respectively, are shown. However, the present application is not limited thereto. For example, measurement portions other than marks can be used as the first measurement portion and the second measurement portion according to the embodiment.

In addition, in the above-described first and second embodiments, examples in which the light shielding layer is formed from a metal layer are shown. However, the present application is not limited thereto. For example, the light shielding layer may be formed from a resin or the like.

In addition, in the above-described first embodiment, an example in which the light shielding layer is formed from the same metal layer as that of the source electrode and the drain electrode is shown. However, the present application is not limited thereto. For example, the light shielding layer may be formed from a metal layer that is different from the layer of the source electrode and the drain electrode.

In addition, in the above-described first embodiment, an example in which the light shielding layer is formed in an area corresponding to the TFT substrate-side mark and the measurement opening portion, and, in the above-described second embodiment, an example in which the light shielding layer is formed on the entire face is shown. However, the present application is not limited thereto. For example, the light shielding layer may be formed only in an area corresponding to the measurement opening portion in which the TFT substrate-side mark and the opposing substrate-side mark are not formed. In addition, in the above-described first embodiment, in a case where the light shielding layer is formed only in an area corresponding to the measurement opening portion, the width of the TFT substrate-side mark 8b is configured to be equal to the interval between the opposing substrate-side mark 21b and the opposing substrate-side mark 21b, and the bonding difference is measured by using the TFT substrate-side mark 8b and the opposing substrate-side mark 21b.

In addition, in the second embodiment, an example in which the light shielding layer is formed from the same metal layer as that of the gate electrode is shown. However, the present application is not limited thereto. For example, the light shielding layer may be formed from a resin or the like.

In addition, in the second embodiment, an example in which the TFT substrate-side mark is formed from the same metal layer as that of the source electrode and the drain electrode is shown. However, the present application is not limited thereto. For example, the TFT substrate-side mark may be formed from a metal layer that is different from the layer of the source electrode and the drain electrode.

In addition, in the above-described first and second embodiments, an example in which the opposing substrate-side mark is formed from the same layer as that of the black matrix is shown. However, the present application is not limited thereto. For example, the opposing substrate-side mark may be formed from a layer that is different from that of the black matrix.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A liquid crystal display device comprising:
   a component substrate that includes a transistor device;
   an opposing substrate that is disposed so as to face the component substrate through a liquid crystal layer;
   a back light that is disposed on a side of the component substrate that is located opposite to the opposing substrate;
   a first measurement portion that is formed on a surface of the component substrate located on the liquid crystal layer side and is used for measuring a difference between bonding positions of the component substrate and the opposing substrate;
   a second measurement portion that is formed on a surface of the opposing substrate located on the liquid crystal layer side and is used for measuring a difference between the bonding positions of the component substrate and the opposing substrate;
   a measurement opening portion that is disposed on the second measurement portion side; and
   a light shielding layer that is disposed between the component substrate and the second measurement portion and prevents transmission of light emitted from the back light through the measurement opening portion.

2. The liquid crystal display device according to claim 1, wherein the light shielding layer is disposed so as to cover at least an area corresponding to the measurement opening portion in the plan view.

3. The liquid crystal display device according to claim 1,
   wherein the first measurement portion and the second measurement portion include a first calibration layer and a second calibration layer, respectively, that have a calibration scale shape used for reading a numeric value, and
   wherein the light shielding layer is disposed so as to have a shape reflecting a shape of the first calibration layer configuring the first measurement portion on a surface of the first measurement portion that is located on a side opposite to the back light.

4. The liquid crystal display device according to claim 3, further comprising:
   an insulating film that is formed between the first measurement portion and the light shielding layer,
   wherein the insulating film is formed in a shape reflecting the shape of the first calibration layer that configures the first measurement portion, and
   wherein the light shielding layer is formed in a shape reflecting a shape of a calibration scale of the insulating film in which the shape of the first calibration layer configuring the first measurement portion is reflected.

5. The liquid crystal display device according to claim 3,
   wherein the first calibration layer and the second calibration layer are formed in a comb-teeth shape in the plan view,
   wherein the light shielding layer that is formed on the surface of the first calibration layer that is located on a side opposite to the back light is formed in a comb-teeth shape in which the shape of the calibration scale of the first calibration layer is reflected in the plan view,
   wherein a width of a comb-teeth portion of the light shielding layer is formed to be approximately equal to a width between a comb-teeth portion and a comb-teeth portion of the second calibration layer, and
   wherein a width of a comb-teeth portion of the first calibration layer is smaller than the width of the comb-teeth portion of the light shielding layer.

6. The liquid crystal display device according to any one of claim 3,
   wherein the transistor device includes a gate electrode, a source electrode, and a drain electrode,
   wherein the first calibration layer is formed from a same metal layer as that of the gate electrode of the transistor device, and
   wherein the light shielding layer is formed from a same metal layer as that of the source electrode and the drain electrode of the transistor device.

7. The liquid crystal display device according to claim 1, wherein the light shielding layer is disposed between the component substrate and the first measurement portion so as to prevent transmission of light emitted from the back light through the measurement opening portion.

8. The liquid crystal display device according to claim 7,
   wherein the first measurement portion and the second measurement portion include a first calibration layer and a second calibration layer, respectively, that have a calibration scale shape used for reading a numeric value,
   wherein the transistor device includes a gate electrode, a source electrode, and a drain electrode,
   wherein the first calibration layer is formed from a same metal layer as that of the source electrode and the drain electrode of the transistor device, and
   wherein the light shielding layer is formed from a same metal layer as that of the gate electrode of the transistor device.

9. The liquid crystal display device according to claim 1, further comprising:
   a black matrix that is disposed on a surface of the opposing substrate that is located on a back light side,
   wherein the second measurement portion is formed from a same layer as that of the black matrix.

10. An electronic apparatus comprising:
    the liquid crystal display device according to claim 1.

* * * * *